United States Patent
Magnetti et al.

(10) Patent No.: US 9,209,672 B2
(45) Date of Patent: Dec. 8, 2015

(54) ELECTRIC MOTOR

(71) Applicant: Johnson Electric S.A., Murten (CH)

(72) Inventors: Gian Carlo Magnetti, Asti (IT); Daniele Paolo Dal Colle, Asti (IT)

(73) Assignee: JOHNSON ELECTRIC S.A., Murten (CH)

( * ) Notice: Subject to any disclaimer, the term of this patent is extended or adjusted under 35 U.S.C. 154(b) by 0 days.

(21) Appl. No.: 14/289,486

(22) Filed: May 28, 2014

(65) Prior Publication Data

US 2014/0265712 A1    Sep. 18, 2014

Related U.S. Application Data

(63) Continuation-in-part of application No. 13/750,260, filed on Jan. 25, 2013.

(30) Foreign Application Priority Data

Jan. 27, 2012   (IT) .................................. TO12A0068
May 28, 2013   (IT) .................................. TO13A0427

(51) Int. Cl.
*H02K 3/12*   (2006.01)
*H02K 23/34*   (2006.01)
*H02K 23/32*   (2006.01)
*H02K 23/30*   (2006.01)

(52) U.S. Cl.
CPC .................. *H02K 23/34* (2013.01); *H02K 3/12* (2013.01); *H02K 23/30* (2013.01); *H02K 23/32* (2013.01)

(58) Field of Classification Search
CPC ........ H02K 23/34; H02K 23/30; H02K 23/32
USPC .................................................. 310/203–207
See application file for complete search history.

(56) References Cited

U.S. PATENT DOCUMENTS

| | | | | |
|---|---|---|---|---|
| 1,628,611 | A | * | 5/1927 | Powell .......................... 310/205 |
| 4,292,559 | A | * | 9/1981 | Auinger et al. ............... 310/206 |
| 2008/0093943 | A1 | * | 4/2008 | Roos ......................... 310/154.45 |

* cited by examiner

*Primary Examiner* — Dang Le
(74) *Attorney, Agent, or Firm* — Muncy, Geissler, Olds & Lowe, P.C.

(57) ABSTRACT

An electric motor has a rotatable armature having two pairs of poles, including a lamination stack which has a shape which is symmetrical about its axis and which forms twenty radial teeth and twenty slots and which has, associated therewith, a commutator with twenty segments, and a distributed closed winding, the conductors of which extend into the slots and are connected to the segments of the commutator in a predetermined manner. The winding of the armature has a lap-type winding or coil section connected to two adjacent segments of the commutator and, in series therewith, a plurality of wave-type winding sections or coils. All of these sections or coils encompass a same number of slots.

7 Claims, 4 Drawing Sheets

ELECTRIC MOTOR

CROSS REFERENCE TO RELATED APPLICATIONS

This application is a continuation-in-part of U.S. application Ser. No. 13/750,260 filed on Jan. 25, 2013, for which priority is claimed under 35 U.S.C. §120; and this application claims priority of Application No. TO2013A000427 filed in Italy on May 28, 2013, and Application No. TO2012A000068 filed in Italy on Jan. 27, 2012, under 35 U.S.C. §119, the entire contents of all of which are hereby incorporated by reference.

FIELD OF THE INVENTION

This invention relates to an electric motor and in particular, to a direct current (DC) motor having a commutator.

More specifically the invention relates to a direct-current electric motor of the type comprising two pairs of poles and a rotatable armature having a lamination stack which defines an even number of slots at least equal to 8 and which has, associated therewith, a commutator with an even number of segments, and a distributed closed winding, the conductors of which extend into said slots and are connected to the segments of the commutator in a predetermined manner; and wherein the winding of the armature comprises a lap-type winding section or coil connected to two adjacent segments of the commutator and, in series therewith, a plurality of wave-type winding sections or coils, said sections or coils encompassing a same number of slots.

BACKGROUND OF THE INVENTION

In electric motors of this type constructed according to the prior art the armature winding is typically of the lap-type or wave-type.

For low-voltage applications with a high current intensity the lap-type winding is generally preferred. An application of this type exists for example in the case of a direct-current electric motor for operating a fan in a motor vehicle.

An electric motor of the type initially specified and provided with a lap-type winding involves the use of a large quantity of copper for formation of the windings and a large number of brushes and associated accessories in the brush-holder. This motor is therefore complex, costly and also relatively heavy.

Prior U.S. patent application Ser. No. 13/750,260 filed on 25 Jan. 2013 by the present inventors, discloses a motor of the type initially defined in which the lamination stack of the armature has a very asymmetrical configuration with eighteen teeth between which eighteen slots are correspondingly defined. The distal ends of the teeth in the lamination stack have an essentially L-shaped configuration. Moreover, the commutator has eighteen segments.

SUMMARY OF THE INVENTION

An object of the present invention is to provide a new electric motor of the type initially defined, which can be made in a simple and low-cost manner.

This object, together with others, is achieved according to the invention with a direct-current electric machine of the type initially specified, characterized in that the lamination stack has a shape which is symmetrical about its axis of rotation and has twenty radial teeth between which twenty slots are correspondingly defined, the commutator having twenty segments.

According to a further characteristic feature, the distal ends—namely the radially outermost ends—of the teeth of the lamination stack of the armature are essentially T-shaped.

Accordingly, in one aspect thereof, the present invention provides a DC electric motor having two pairs of poles, comprising a rotatable armature including a lamination stack which defines an even number of slots at least equal to eight and which has, associated therewith, a commutator with an even number of segments, and a distributed closed winding, the conductors of which extend into said slots and are connected to the segments of the commutator in a predetermined manner; and wherein the winding of the armature comprises a lap-type winding section or coil connected to two adjacent segments of the commutator and, in series therewith, a plurality of wave-type winding sections or coils; all of said winding sections or coils encompassing a same number of slots; wherein the lamination stack of the armature has a shape which is symmetrical about its axis and has twenty radial teeth between which twenty slots are correspondingly defined, the commutator having twenty segments.

Preferably, said lap-type section or coil is the first one which is formed when constructing the armature winding.

Preferably, each section or coil of the winding of the armature encompasses three slots.

Preferably, the distal ends of the teeth of the lamination stack are essentially T-shaped.

Preferably, the motor has a brush-holder with only two brushes which cooperate with the commutator.

Preferably, the motor has four stator poles formed by one or more permanent magnets.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 4:
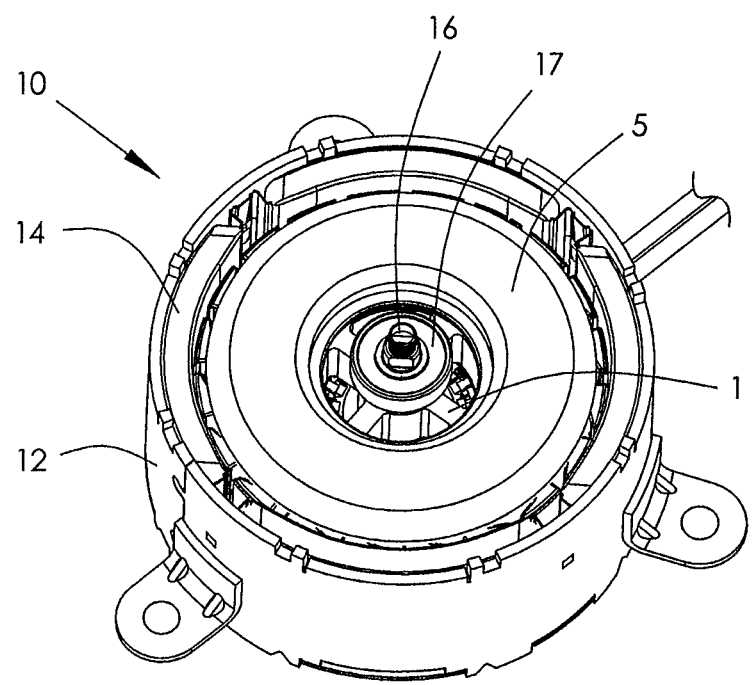
FIG. 4 is an assembled view of the motor incorporating the rotor of FIG. 1.

A DC motor 10 according to a preferred embodiment of the present invention is shown in FIG. 4. The motor 10 has a housing 12, shown with a cover or end cap removed to show the inside of the housing. Four magnets 14 are fixed to an inner surface of the housing to form four stator poles. The armature 1 is rotatably disposed within the housing and has a shaft 16 mounted in bearings 17 (only one visible) fixed to the end caps of the housing.

Figure 1:
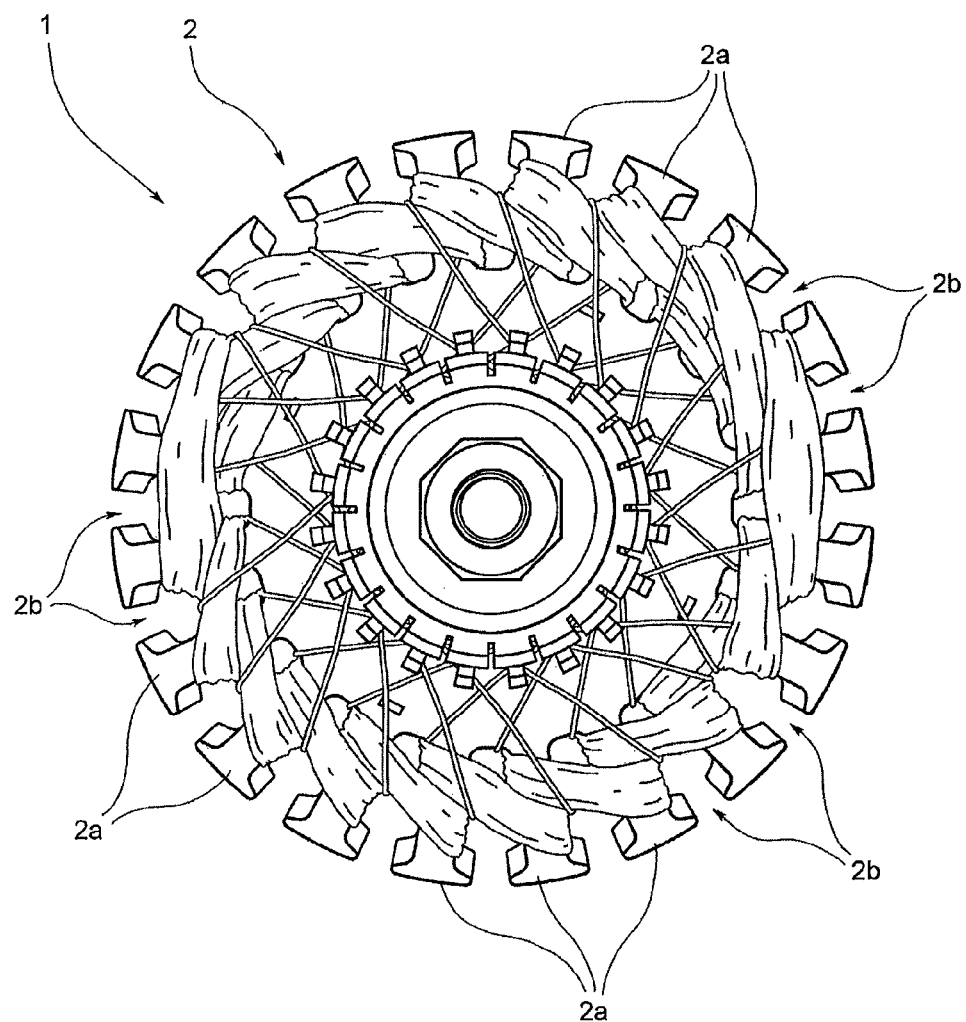
FIG. 1 shows a perspective view of the armature of a direct-current electric motor comprising a commutator, in accordance with the present invention.
Figure 2:
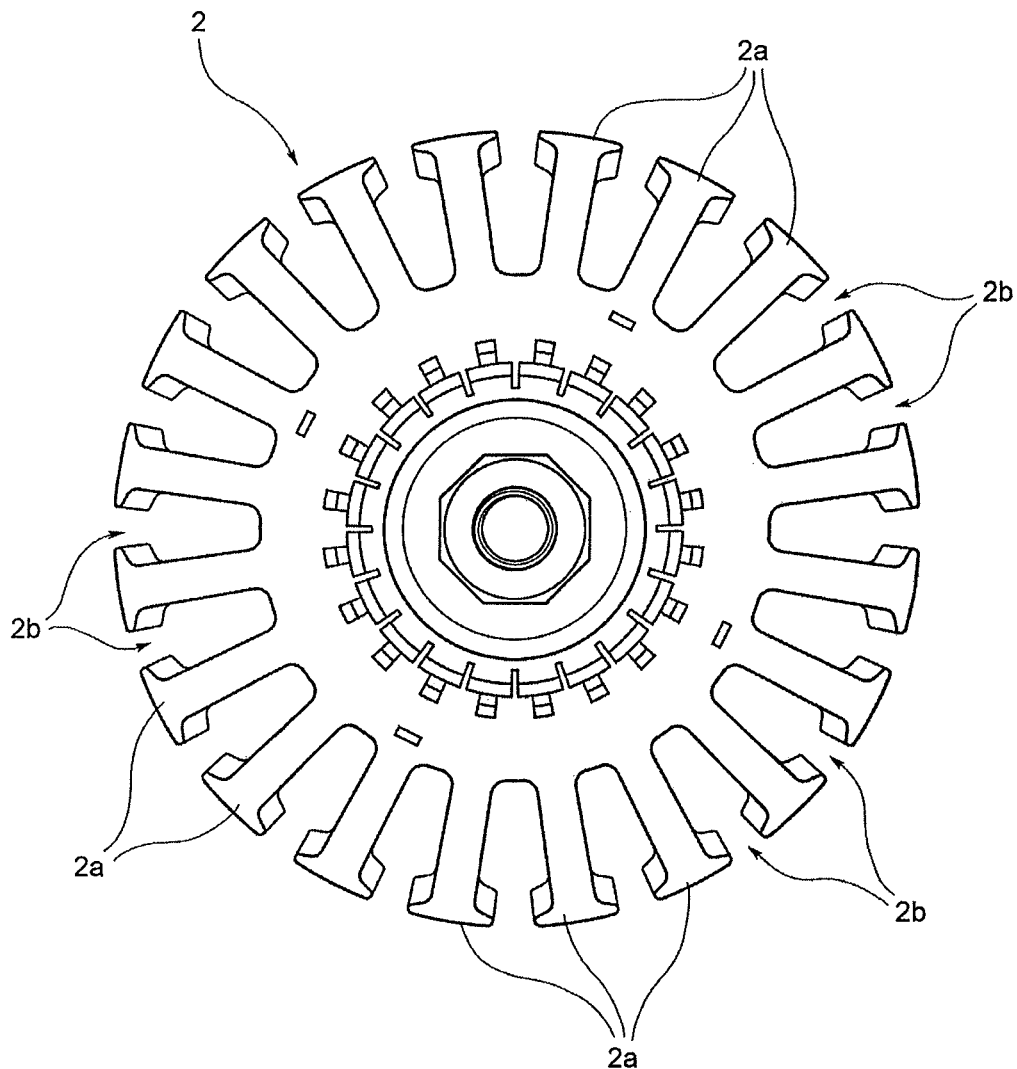
FIG. 2 is a front view of the lamination stack and the commutator of the armature of the electric motor shown in FIG. 1.

The armature 1 of the motor 10 is shown in more detail in FIG. 1. The armature has two pairs of poles and a core formed by a stack of laminations 2. The lamination stack is visible more clearly in FIG. 2.

The lamination stack 2 has a symmetrical configuration about its axis of rotation and forms twenty radial teeth 2a between which twenty slots 2b are correspondingly defined. The distal ends of the teeth 2a of the lamination stack 2 are essentially T-shaped, with the crosspiece being oriented in the circumferential direction. The teeth 2a have the same angular extension, as is likewise the case for the slots 2b.

The armature 1 also comprises a distributed closed winding denoted overall by 5 in FIG. 1. This winding is formed by insulating electrical conductors which extend into the slots 2b of the lamination stack 2 and are connected to the segments 4 of the commutator 3 in a predetermined manner.

Figure 3:
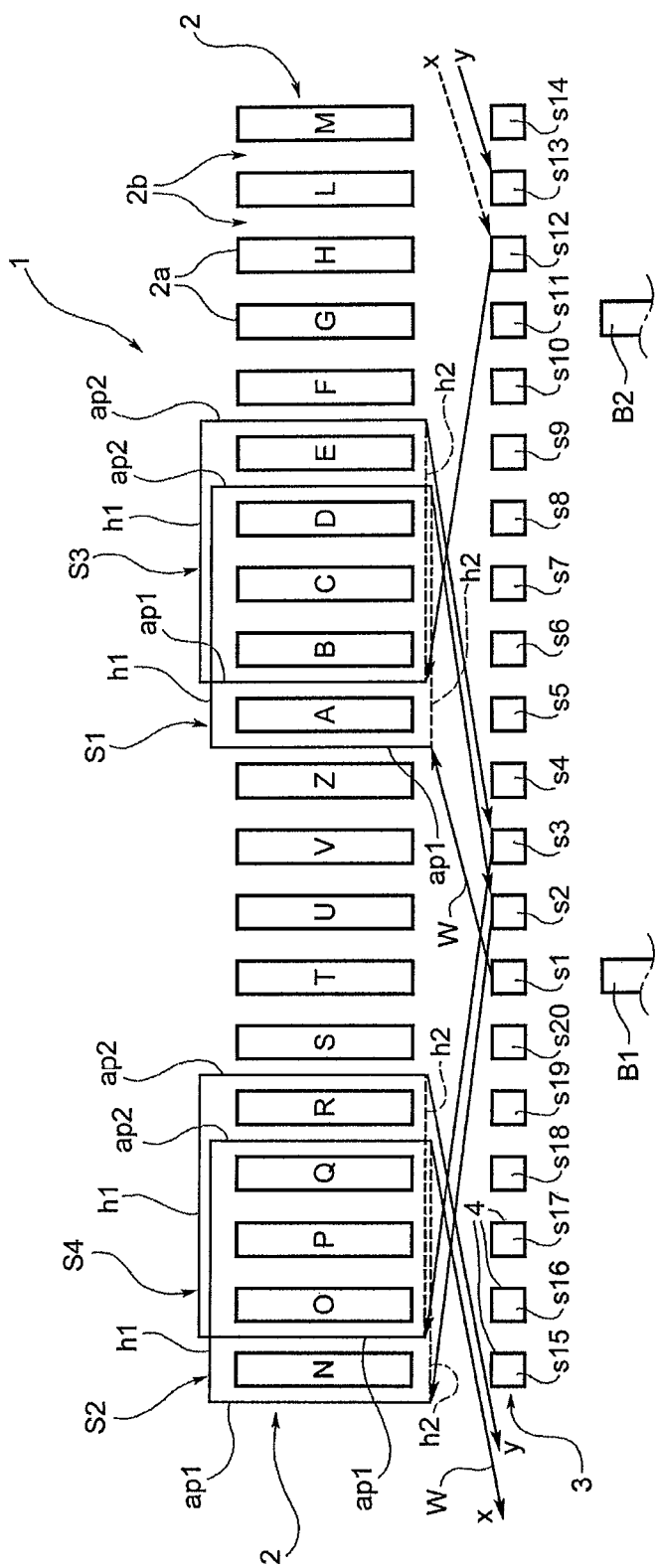
FIG. 3 is a schematic linear illustration of the armature of an electric motor according to the invention, showing schematically the layout of its winding.

FIG. 3 shows schematically an embodiment of the armature winding 5 of a direct-current electric motor according to the invention. In the diagram shown in FIG. 3, the twenty teeth 2a of the lamination stack 2 are identified by the letters A to S, and the segments 4 of the commutator 3 are identified by the symbols s1 to s18.

In the example of embodiment shown in FIG. 3, the armature winding 5 is formed with an insulated conductor wire W which, extending from the segment of the commutator indicated by s1, forms a first lap-type winding section or coil S1, formed by, for example, ten wound turns around the set of teeth A-D of the lamination stack 2 of the armature.

In particular, the wound turns of the section or coil S1 comprise active portions ap1 and ap2 which extend into the slots between the teeth Z and A and between the teeth D and E, respectively.

After completion of the lap-type section or coil S1, the wire W emerging from this section or coil is connected to the segment of the commutator indicated by s2 and then continues to form successive wave-type sections or coils.

In particular, with reference to the diagram shown in FIG. 3, starting from the segment s2 of the commutator the conductor wire W forms a second winding section or coil S2 around the set of teeth N-Q, with active portions ap1 and ap2 in the slots between the teeth M and N and between the teeth Q and R, respectively, and with front connections or bridges indicated by h1 and h2.

Once the winding section or coil S2 has been completed, the emerging conductor wire W is connected to the segment of the commutator denoted by s12 and from here continues to form a further winding section or coil S3, likewise of the wave-type, with active portions ap1 and ap2 between the pairs of teeth A and B and E and F, respectively.

The winding section or coil S3, as well as the sections S2 and S1, encompass a set of four teeth B-E of the lamination stack 2.

Emerging from the section or coil S3, the conductor wire W is connected to the segment s3 and from here continues, so as to form a following section or coil S4, likewise of the wave-type.

The winding section or coil S4 encompasses a set of four teeth O-R of the lamination stack 2 and has active portions ap1 and ap2 which extend into the slots between the teeth N and O and between the teeth R and S, respectively.

From the section or coil S4, the wire W is connected to the segment s13 of the commutator.

The construction of the armature winding 5 then continues with the formation of further wave-type sections or coils, having intervals corresponding to those of the preceding wave-type sections or coils S2-S4, until the wire reaches again the segment of the commutator indicated by s1.

With the armature winding 5 formed in accordance with the diagram shown in FIG. 3, the brush-holder associated with the commutator 3 may be conveniently formed with only two brushes B1 and B2 and associated accessories (guide cases, springs, connecting braids, etc.). This results in significant savings in cost-related terms and a reduction in weight.

The armature winding 5 shown in FIG. 3 compared to a conventional winding entirely of the lap type results in a substantial saving in the amount of copper used, equivalent to about 25% in weight. This results in significant cost advantages and a convenient reduction in weight.

Obviously, without altering the principle of the invention, the embodiments and the constructional details may be greatly varied with respect to that described and illustrated purely by way of a non-limiting example, without thereby departing from the scope of the invention as defined in the accompanying claims.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. Direct-current electric motor having two pairs of poles, comprising a rotatable armature including a lamination stack which defines an even number of slots at least equal to eight and which has, associated therewith, a commutator with an even number of segments, and a distributed closed winding, the conductors of which extend into said slots and are connected to the segments of the commutator in a predetermined manner; and
    wherein the winding of the armature comprises a lap-type winding section or coil connected to two adjacent segments of the commutator and, in series therewith, a plurality of wave-type winding sections or coils; all of said winding sections or coils encompassing a same number of slots;
    wherein the lamination stack of the armature has a shape which is symmetrical about its axis and has twenty radial teeth between which twenty slots are correspondingly defined, the commutator having twenty segments.

2. The motor of claim 1, wherein said lap-type section or coil is the first one which is formed when constructing the armature winding.

3. The motor of claim 1, wherein each section or coil of the winding of the armature encompasses three slots.

4. The motor of claim 1, wherein the distal ends of the teeth of the lamination stack are essentially T-shaped.

5. The motor of claim 1, comprising a brush-holder with only two brushes which cooperate with the commutator.

6. The motor claim 5, wherein the motor has four stator poles formed by one or more permanent magnets.

7. The motor claim 1, wherein the motor has four stator poles formed by one or more permanent magnets.

* * * * *